United States Patent [19]

Hitchcock

[11] 4,259,455

[45] Mar. 31, 1981

[54] FIRE RETARDANT SILOXANE FOAMS AND METHOD FOR PREPARATION

[76] Inventor: Lloyd Hitchcock, 5658 Mohican Dr., Stevensville, Mich. 49127

[21] Appl. No.: 148,825

[22] Filed: May 12, 1980

[51] Int. Cl.$^3$ .................................................. C08J 9/00
[52] U.S. Cl. ............................... 521/122; 260/37 SB; 260/45.7 R; 260/DIG. 24; 521/91; 521/154; 525/477; 525/478; 528/15; 528/31; 528/32
[58] Field of Search ...... 260/37 SB, 45.7 R, DIG. 24; 528/31, 32, 15; 525/477, 478; 521/154, 122, 91, 907

[56] References Cited

U.S. PATENT DOCUMENTS

| | | | |
|---|---|---|---|
| 3,428,580 | 2/1969 | Nitzsche et al. | 521/154 |
| 4,189,545 | 2/1980 | Modic | 521/154 |

Primary Examiner—Morton Foelak
Attorney, Agent, or Firm—Waters & Lesniak

[57] ABSTRACT

A method for preparing a siloxane foam by mixing an organohydrogensiloxane, a hydroxylated organosiloxane, a platinum catalyst, and an aluminum silicate, and thereafter allowing a foam to form. Preferably, the aluminum silicate comprises about from thirty percent (30%) to about forty percent (40%) by weight of the total composition. The new foams are economical and have improved fire retardancy, physical strength, sealing and wear characteristics, and consistency of composition. The new foams are especially useful as fire retardant insulation in the construction industry, especially as a protective encasement for mechanical and electrical wires, pipes, conduits, and the like.

15 Claims, No Drawings

FIRE RETARDANT SILOXANE FOAMS AND METHOD FOR PREPARATION

BACKGROUND OF THE INVENTION

1. Field of the Invention

This invention relates to improved fire retardant siloxane foams and a method for their preparation.

2. Description of the Prior Art

Siloxane foams and methods for their preparation are well known in the prior art, such as for example, as disclosed in U.S. Pat. No. 3,923,705 and U.S. Pat. No. 4,026,842. While these foams have been used in a variety of applications, there has been increasing use of these foams in the construction industry as fire retardant insultation, especially as a protective encasement for mechanical and electrical wires, pipes, conduits, and the like. In an effort to improve the physical properties of the siloxane foams, such as physical strength and fire retardancy, various fillers and additives have been employed. For example, additives such as carbon black, organosilanols, silica, asbestos, potassium titanate, and a variety of other additives have been tried such as disclosed in U.S. Pat. Nos. 4,026,842; 4,026,835; 3,677,981; 3,923,705; 3,425,967; 3,428,580; and 3,338,847. While some of the additives tried heretofore have proven to be satisfactory for specialized applications, none has yielded an economical product for use in the construction industry with sufficient strength, fire retardancy, sealing and wear characteristics and consistency of composition.

SUMMARY OF THE INVENTION

According to the present invention, there is provided a method of preparing a new siloxane foam which is economical and which has improved fire retardancy, physical strength, sealing and wear characteristics, and consistency of composition.

The method comprises mixing an organohydrogensiloxane, a hydroxylated organosiloxane, a platinum catalyst and an aluminum silicate, and thereafter allowing a foam to form.

DESCRIPTION OF THE PREFERRED EMBODIMENTS

The preferred organohydrogensiloxanes, hydroxylated organosiloxanes and platinum catalysts are those described in U.S. Pat. No. 3,923,702, the disclosures of which are hereby incorporated by reference. The preferred organohydrogensiloxane has an average of at least three silicon-bonded hydrogen atoms per molecule, an average of no more than one silicon-bonded hydrogen atom per silicon atom and organic radicals selected from the group consisting of alkyl radicals having from one to six carbon atoms per radical, such as methyl, ethyl, propyl, isopropyl, butyl, tertiary butyl, pentyl, hexyl and cyclohexyl, or phenyl or 3,3,3 trifluropropyl. The organohydrogensiloxanes can be homopolymers, copolymers and mixtures thereof which contain siloxane units of the following types:

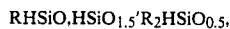

where R is the monovalent radical defined above. Some specific examples include polymethylhydrogensiloxane cyclics, copolymers of trimethylsiloxy and methylhydrogensiloxane, copolymers of dimethylhydrogensiloxy and methylhydrogensiloxane, copolymers of trimethylsiloxy, dimethylsiloxane and methylhydrogensiloxane and copolymers of dimethylhydrogensiloxane, dimethysiloxane and methylhydrogensiloxane. Preferably, the organohydrogensiloxanes have an average of at least five silicon-bonded hydrogen atoms per molecule.

The preferred hydroxylated organosiloxane has an average of from greater than 1.0 to 2.5 silicon-bonded hydroxyl radicals per molecule and has an average of at least one organic radical per silicon atom selected from the group consisting of alkyl radicals having from one to six carbon atoms per radical, phenyl and 3,3,3-trifluoropropyl. The organic radicals can be of any of those monovalent radicals described above for the organohydrogensiloxane. The hydroxylated organosiloxanes can be homopolymers, copolymers or mixtures thereof. They can be mixtures of different molecular weight species and varying hydroxyl contents as long as the average falls within the defined range. The hydroxylated organosiloxane contains at least one organic radical per silicon atom. Examples of the hydroxylated organosiloxane include hydroxyl endblocked polydimethylsiloxane, hydroxyl endblocked polydiorganosiloxane having siloxane units of dimethylsioloxane and phenylmethylsiloxane, hydroxyl endblocked polymethyl-3,3,3-trifluoropropylsioloxane and hydroxyl endblocked polyorganosiloxane having siloxane units of monomethylsiloxane, dimethylsiloxane, monophenylsiloxane and diphenylsiloxane. The hydroxylated organosiloxanes of this invention also include mixtures of hydroxylated organosiloxane polymers and hydroxylated organosilanes, such as a mixture of hydroxyl endblocked polydimethylsiloxane and diphenylmethylsilanol. As long as some hydroxylated organosiloxane polymer having two or more hydroxyl radicals per molecule is present, hydroxylated silanes can be used to provide from greater than 1.0 to 2.5 silicon-bonded hydroxyl radicals per molecule.

The platinum catalyst can be any of the known forms, ranging from platinum as deposited on carriers such as silica gel or powdered charcoal, to platinic chloride, salts of platinum and chloroplatinic acid. The preferred forms of platinum are the chloroplatinic acid either as the commonly obtainable hexahydrate or the anhydrous form, a chloroplatinic acid catalyst complex as prepared by the method described in U.S. Pat. No. 3,419,593 which is hereby incorporated by reference, where chloroplatinic actid hexahydrate is mixed with symmetrical divinyltetramethyldisiloxane to provide the complex, and a complex prepared from the chloroplatinic acid hexahydrate, symmetrical divinyltetramethyldisiloxane, symmetrical tetramethyldisiloxane and alcohol solvent.

The organohydrogensiloxanes, hydroxylated organosiloxanes and platinum catalysts which are especially preferred are those commercially available from the Dow Corning Corporation marketed under their designation 3-6548 RTV Silicone Foam as a two-part foam system.

The aluminum silicate is a ceramic fiber and any of the commercially available aluminum silicate fibers are generally satisfactory for use in the present invention. The preferred aluminum silicate is a complex of about 40 to 65 percent $Al_2O_3$ and about 35 to 60 percent $SiO_2$ by weight and may include small amounts of oxides such as $Na_2O$, $B_2O_3$, $Fe_2O_3$, $ZrO_2$ and other trace oxides. For better dispersion and homogeneity in producing the foam product of the present invention, the aluminum silicate fibers are processed to reduce fiber lengths, such as by known chopping or milling techniques. Especially preferred are the aluminum silicate fibers commercially available from the Carborundum Company which are sold under the trademark "Fiberfrax". The preferred Fiberfrax fiber has a composition of about 52 percent $Al_2O_3$, 48% $SiO_2$ and trace amounts of $Na_2O$, $B_2O_3$ and $Fe_2O_3$ and is a milled fiber with average fiber lengths of about 0.0005 to 0.004 of an inch and a mean fiber diameter of about 3 microns.

The method of this invention is to mix the ingredients and obtain a foam at room temperature. These ingredients can be mixed in any manner. Thus, the organohydrogensiloxane can be mixed with the platinum catalyst and the aluminum silicate and then mixed with the hydroxylated organosiloxane or the platinum catalyst and the aluminum silicate can be mixed with the hydroxylated organosiloxane and then mixed with the organohydrogensiloxane or the platinum catalyst can be mixed with one of the siloxanes and the aluminum silicate with the other followed by mixing the mixtures. Other methods of mixing are also suitable such as the hydroxylated organosiloxane can be divided into two proportions where one proportion is mixed with the platinum catalyst and the other proportion is mixed with the organohydrogensiloxane and either one or both are mixed with the aluminum silicate, and then the two mixtures are combined to form a foam.

To control the foaming and curing reactions which are taking place simultaneously, a platinum catalyst inhibitor, such as polymethylvinylsiloxane cyclic compounds and acetylenic alcohols can be added. The platinum catalyst inhibitors are known in the art and many varieties are available. These inhibitors should however not interfere with the foaming and curing in such a manner that destroys the foam product of this invention. The mixture of ingredients should be placed in the desired place where they are to be used as soon as they are mixed because foaming begins immediately, unless a platinum catalyst inhibitor is used to extend the pot life such that they can be mixed and then put in the desired place of use. The amounts of inhibitors are present in relatively small amounts, such as up to 2 parts by weight polymethylvinylsiloxane cyclics can be used to control the initiation of the foaming and curing. The polymethylvinylsiloxane cyclics are known in the art and can be prepared by hydrolyzing methylvinyldichlorosilane, for example.

The platinum catalyst can be present in amounts sufficient to provide from 5 to 200 parts by weight platinum per one million parts by weight of the organophydrogensiloxane and hydroxylated organosiloxane (p.p.m.). Preferably, the platinum catalyst is present in amounts to provide from 10 to 50 p.p.m. platinum. Amounts of platinum catalyst which provide less than 5 p.p.m. platinum are insufficient to cause a foam to form and amounts in excess of 200 p.p.m. platinum are uneconomical. For this invention the higher amounts of platinum catalyst should be used with a platinum catalyst inhibitor because the rate of foaming and curing increases with increasing platinum concentration and if the rate becomes too fast, mixing the ingredients is a problem.

The organohydrogensiloxane and hydroxylated organosiloxane are combined in amounts sufficient enough to provide a ratio of silicon-bonded hydrogen atoms to silicon-bonded hydroxyl radicals of from 2.5 to 40, preferably from 4 to 10. Preferably, the organohydrogensiloxane and the hydroxylated organosiloxane each comprise from about 30 to about 35 percent by weight of the total composition, with about equal amounts of these two ingredients being especially preferred.

The aluminum silicate preferably comprises from about 30 percent to about 40 percent by weight of the total composition with about from 32 percent to 35 percent by weight being especially preferred. It has been found that using less than about 30 percent by weight of the aluminum silicate is detrimental to the improved fire retardancy, physical strength, wear characteristics and general consistency of the foam product. On the other hand, if substantially more than 40 percent of the aluminum silicate is utilized, the foam expansion is severely affected which adversely affects the sealing characteristics of the foam when used in construction applications.

The optimum results in making a foam for use as a sealant in the construction industry are yielded when the organohydrogensiloxane, hydroxylated organosiloxane, and aluminum silicate are added in approximately equal proportions.

In use, especially in construction applications, the ingredients of the novel foam composition are preferably mixed on site either manually or by the use of conventional liquid mixing spray guns and the like. A typical application for the foam product of the present invention is to introduce the composition immediately after mixing into cable and conduit penetrations in floors or walls at a construction site. Once mixed, the mixture has a snap time of approximately one to three minutes before the composition expands and cures in place to a resilient foam. Once the product completes its initial cure and sets up, it takes from six to eight hours to complete its final cure, which is approximately 25 percent less than the time for final curing required for known siloxane foams. On expansion, the foam of the present invention conforms to irregular surfaces and contours to provide a water-tight barrier which prevents water damage in the event of a fire. The foam also provides an air-tight barrier to prevent smoke passage during a fire. Because of the consistency of expansion of the foam of the present invention and its higher density, the water and air sealing characteristics are far superior to conventional siloxane foams. In addition, after the foam is in place, if there is a need to add additional cable or wires or the like through the sealed opening or passageway, a pathway for such new elements can be pierced through the foam with no need for removing or replacing the foam. Upon threading the new wires or the like through the new passageway, the foam of the present invention, because of its resiliency and density, which is about 25 lbs./ft.$^3$ as compared to about 16 lbs./ft.$^3$ for known siloxane foams, will immediately form a seal around the newly inserted cable or the like. With existing foams, it is generally necessary to remove the original foam product and introduce a new foaming composition to reseal the opening or penetration after the installation of the new cable, etc.

The foams of the present invention consistently pass the Factory Mutual Test ASTM E-119 by being capable of withstanding temperatures of up to 2,000° F. for three hours without breaking down. The surprising feature of the foam of the present invention is that the thickness required to pass this fire test is greatly reduced. Whereas siloxane foams of the prior art require at least about a nine to twelve inch thickness to successfully pass this test, the foams of the present invention successfully pass these tests with thicknesses as low as from five to six inches. This has the obvious advantage of being able to use the foam of the present invention with full compliance of the fire test requirements in penetrations and openings less than nine inches which could not be accomplished by the siloxane foams known heretofore. Furthermore, the foams of the present invention are far more economical than the foams used heretofore since the aluminum silicate components are far less expensive than the siloxane components. Therefore, savings of up to 40 percent are realized in the expense of the ingredients while yielding superior results in the application.

The following examples are only illustrative of the method and foam of the present invention and are not to be construed as limiting the present invention which is set forth in the appended claims.

EXAMPLES 1-5

Siloxane foams according to the present invention were prepared with the ingredients listed in Table I with the results listed in Table II. In Table I, Polymer A is an organohydrogensiloxane commercially available from Dow Corning identified as Part A of Dow Corning's 3-6548 silicone RTV foam. Polymer B is a hydroxylated organosiloxane commercially available from Dow Corning and identified as Part B of Dow Corning's 3-6548 silicone RTV foam. The platinum catalyst is a chloroplatinic acid catalyst complex. The aluminum silicate is a ceramic fiber commercially available from the Carborundum Company which is sold under the trademark FIBERFRAX and which has a composition of about 52% $Al_2O_3$, 48% $SiO_2$ and trace amounts of $NaO_2$, $B_2O_3$ and $Fe_2O_3$. It is a milled fiber with average fiber lengths of about 0.0005 to 0.004 of an inch and a mean fiber diameter of about 3 microns. In each example, the foams were prepared by adding the platinum catalyst and one half of the amount of aluminum silicate to Polymer A with slow mixing with an electric mixer, followed by thorough mixing for approximately three minutes. The remaining one half amounts of aluminum silicate were added to Polymer B with slow mixing with an electric mixer, followed by thorough mixing for approximately three minutes. The two compositions were then run through a commercially available foam gun to initiate the foaming in an amount to provide five inch thick slabs. The results are reflected in Table II.

TABLE I

|  | 1 | 2 | 3 | 4 | 5 |
|---|---|---|---|---|---|
| Polymer A (wt.%) | 34 | 33.3 | 32.5 | 31.5 | 30.5 |
| Polymer B (wt.%) | 34 | 33.3 | 32.5 | 31.5 | 30.5 |
| Platinum Catalyst (P.P.M.) | 30 | 30 | 30 | 30 | 30 |
| Aluminum Silicate (wt.%) | 32 | 33.3 | 35 | 37 | 39 |

TABLE II

|  | 1 | 2 | 3 | 4 | 5 |
|---|---|---|---|---|---|
| Density (lbs./ft.$^3$) | 23.78 | 24.97 | 25.96 | 28.44 | 29.19 |
| Snap Time (Sec.) | 90 | 95 | 110 | 120 | 130 |
| Expansion (%) | 270 | 250 | 238 | 230 | 225 |
| ASTM E-119 Fire Test | passed | passed | passed | passed | passed |

It should be understood that the embodiments of the present invention described herein are merely typical, illustrative examples of the preferred practice of the present invention and various changes, modifications, and variations may be made which will be obvious to those skilled in the art without departing from the spirit and scope of the present invention.

The embodiments of the invention in which an exclusive property or privilege is claimed are defined as follows:

1. A method of preparing an organosiloxane foam comprising mixing an organohydrogensiloxane having an average of at least three silicon-bonded hydrogen atoms per molecule, an average of no more than one silicon-bonded hydrogen atom per silicon atom and organic radicals selected from the group consisting of alkyl radicals having from one to six carbon atoms per radical, phenyl and 3,3,3-trifluoropropryl; a hydroxylated organosiloxane having an average of from greater than 1.0 to 2.5 silicon-bonded hydroxyl radicals per molecule and having an average of at least one organic radical per silicon atom selected from the group consisting of alkyl radicals having from one to six carbon atoms per radical, phyenyl and 3,3,3-trifluoropropyl; a platinum catalyst in an amount of from 5 to 200 parts by weight platinum per one million parts by weight of the combined weight of said organohydrogensiloxane and hydroxylated organosiloxane, said organohydrogensiloxane and said hydroxylated organosiloxane being present in sufficient amounts to provide a molar ratio of silicon-bonded hydrogen atoms to silicon-bonded hydroxyl radicals of 2.5 to 40; and an aluminum silicate, and thereafter allowing a foam to form.

2. The method in accordance with claim 1 wherein said organohydrogensiloxane is a trimethylsiloxy endblocked polymethylhydrogensiloxane and said hydroxylated organosiloxane is a hydroxyl endblocked polydimethylsiloxane.

3. The method in accordance with claim 1 wherein said aluminum silicate is a complex comprising about from 40 to 65 percent by weight $Al_2O_3$ and about from 35 to about 60 percent by weight $SiO_2$.

4. The method in accordance with claim 3 wherein the amount of said aluminum silicate added comprises from about 30 percent to about 40 percent by weight of the total composition.

5. The method in accordance with claim 3 wherein said aluminum silicate is a complex comprising by weight about 52 percent $Al_2O_3$ and 48 percent $SiO_2$.

6. The method in accordance with claim 4 wherein said aluminum silicate is a complex comprising by weight about 52 percent $Al_2O_3$ and 48 percent $SiO_2$.

7. The method in accordance with claim 3 wherein said organohydrogensiloxane and said hydroxylated organosiloxane each comprise from about 30 to about 35 percent by weight of the total composition and said aluminum silicate comprises from about 32 to about 35 percent by weight of the total composition.

8. The method in accordance with claim 7 wherein said aluminum silicate has an average fiber length of about from 0.0005 to about 0.004 of an inch and a mean fiber diameter of about 3 microns.

9. The method in accordance with claim 2 wherein said aluminum silicate is a complex comprising about from 40 to about 65 percent by weight $Al_2O_3$ and about from 35 to about 60 percent by weight $SiO_2$.

10. The method in accordance with claim 9 wherein the amount of said aluminum silicate added comprises about from 30 percent to about 40 percent by weight of the total composition.

11. The method in accordance with claim 9 wherein said aluminum silicate is a complex comprising by weight about 52 percent $Al_2O_3$ and 48 percent $SiO_2$.

12. The method in accordance with claim 10 wherein said aluminum silicate is a complex comprising by weight about 42 percent $Al_2O_3$ and 48 percent $SiO_2$.

13. The method in accordance with claim 9 wherein said organohydrogensiloxane and said hydroxylated organosiloxane each comprise from about 30 to about 35 percent by weight of the total composition and said aluminum silicate comprises from about 32 to about 35 percent by weight of the total composition.

14. The method in accordance with claim 13 wherein said aluminum silicate has an average fiber length of about from 0.0005 to 0.004 of an inch and a mean fiber diameter of about 3 microns.

15. A foam prepared by the method of claims 1, 2, 3, 4, 5, 6, 7, 8, 9, 10, 11, 12, 13 or 14.

* * * * *